(12) United States Patent
Viveganandhan et al.

(10) Patent No.: US 9,923,945 B2
(45) Date of Patent: Mar. 20, 2018

(54) VIRTUAL ASSETS FOR ON-DEMAND CONTENT GENERATION

(71) Applicant: CISCO TECHNOLOGY, INC., San Jose, CA (US)

(72) Inventors: Mahesh Vittal Viveganandhan, Cupertino, CA (US); Eric Colin Friedrich, Somerville, MA (US); Matthew Francis Caulfield, Clinton, MA (US); Carol Etta Iturralde, Framingtonham, MA (US); Scott C. Labrozzi, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 776 days.

(21) Appl. No.: 14/051,234

(22) Filed: Oct. 10, 2013

(65) Prior Publication Data

US 2015/0106472 A1     Apr. 16, 2015

(51) Int. Cl.
    *H04L 29/06* (2006.01)
    *H04N 21/2183* (2011.01)
    (Continued)

(52) U.S. Cl.
    CPC ....... *H04L 65/601* (2013.01); *H04N 21/2183* (2013.01); *H04N 21/237* (2013.01); *H04N 21/2347* (2013.01); *H04N 21/2387* (2013.01); *H04N 21/2393* (2013.01); *H04N 21/23106* (2013.01); *H04N 21/23439* (2013.01); *H04N 21/234309* (2013.01); *H04N 21/2541* (2013.01);
    (Continued)

(58) Field of Classification Search
    CPC . H04L 65/601; H04N 21/2183; H04N 21/237
    USPC .......................................................... 709/217
    See application file for complete search history.

(56) References Cited

U.S. PATENT DOCUMENTS

| 5,553,061 A | 9/1996 | Waggener et al. |
| 6,065,060 A | 5/2000 | DeMoney |

(Continued)

FOREIGN PATENT DOCUMENTS

| EP | 1622385 | 2/2006 |
| WO | WO2006/004472 | 1/2006 |

(Continued)

OTHER PUBLICATIONS

USPTO Jul. 31, 2014 Final Office Action from U.S. Appl. No. 13/363,933.

(Continued)

*Primary Examiner* — Wing F Chan
*Assistant Examiner* — Leon Y Tseng
(74) *Attorney, Agent, or Firm* — Merchant & Gould P.C.

(57) ABSTRACT

A method is provided in one example embodiment and includes generating a key associated with a virtual asset associated with content to be provided to a client device, where the key indicates at least one parameter for accessing the content; generating the virtual asset; receiving a request for the content; identifying a format being requested for the content; using the virtual asset to identify common format content to be retrieved and to identify the key; using the key to retrieve the common format content; and transforming the common format content such that it can be delivered to the client device in the format that was requested.

20 Claims, 6 Drawing Sheets

(51) Int. Cl.

| | | |
|---|---|---|
| *H04N 21/231* | (2011.01) | |
| *H04N 21/2343* | (2011.01) | |
| *H04N 21/2347* | (2011.01) | |
| *H04N 21/237* | (2011.01) | |
| *H04N 21/2387* | (2011.01) | |
| *H04N 21/239* | (2011.01) | |
| *H04N 21/254* | (2011.01) | |
| *H04N 21/262* | (2011.01) | |
| *H04N 21/2662* | (2011.01) | |
| *H04N 21/472* | (2011.01) | |
| *H04N 21/845* | (2011.01) | |

(52) U.S. Cl.
CPC ... *H04N 21/2662* (2013.01); *H04N 21/26258* (2013.01); *H04N 21/47202* (2013.01); *H04N 21/8456* (2013.01)

(56) References Cited

U.S. PATENT DOCUMENTS

| | | | |
|---|---|---|---|
| 6,167,030 | A | 12/2000 | Kilkki et al. |
| 6,345,307 | B1 | 2/2002 | Booth |
| 6,493,386 | B1 | 12/2002 | Vetro et al. |
| 6,542,546 | B1 | 4/2003 | Vetro et al. |
| 6,804,198 | B1 | 10/2004 | Iwamoto |
| 7,245,586 | B2 | 7/2007 | Bitar et al. |
| 7,961,607 | B2 | 6/2011 | De Cnodder et al. |
| 8,301,982 | B2 | 10/2012 | Ver Steeg et al. |
| 8,903,411 | B1 | 12/2014 | Reeves et al. |
| 9,148,386 | B2 | 9/2015 | Gahm et al. |
| 2001/0047517 | A1 | 11/2001 | Christopoulos et al. |
| 2003/0004998 | A1* | 1/2003 | Datta ............... G06F 17/30902 715/234 |
| 2003/0030752 | A1 | 2/2003 | Begeja et al. |
| 2003/0236904 | A1 | 12/2003 | Walpole |
| 2004/0186877 | A1 | 9/2004 | Wang et al. |
| 2005/0055712 | A1 | 3/2005 | Whyte et al. |
| 2006/0007958 | A1 | 1/2006 | Kang |
| 2006/0095515 | A1 | 5/2006 | Forstadius |
| 2007/0008986 | A1 | 1/2007 | Xie et al. |
| 2007/0022185 | A1 | 1/2007 | Hamilton et al. |
| 2007/0033623 | A1 | 2/2007 | Fredrickson et al. |
| 2007/0162568 | A1 | 7/2007 | Gupta |
| 2007/0280232 | A1 | 12/2007 | Dec et al. |
| 2008/0025230 | A1 | 1/2008 | Patel et al. |
| 2008/0123660 | A1 | 5/2008 | Sammour et al. |
| 2008/0263219 | A1 | 10/2008 | Bacchi et al. |
| 2008/0267222 | A1 | 10/2008 | Leung et al. |
| 2009/0055417 | A1 | 2/2009 | Hannuksela |
| 2011/0072148 | A1 | 3/2011 | Begen et al. |
| 2011/0082924 | A1 | 4/2011 | Gopalakrishnan |
| 2011/0087794 | A1 | 4/2011 | Li et al. |
| 2011/0090897 | A1 | 4/2011 | Johnson |
| 2011/0090953 | A1 | 4/2011 | Melnyk et al. |
| 2011/0138020 | A1 | 6/2011 | Pantos et al. |
| 2011/0141885 | A1 | 6/2011 | Chen |
| 2011/0225303 | A1 | 9/2011 | Engebretson et al. |
| 2011/0268181 | A1 | 11/2011 | Joshi |
| 2011/0289538 | A1 | 11/2011 | Begen et al. |
| 2011/0292981 | A1 | 12/2011 | Kihara et al. |
| 2011/0307781 | A1* | 12/2011 | Sood ...................... G11B 27/34 715/716 |
| 2012/0013748 | A1 | 1/2012 | Stanwood et al. |
| 2012/0079528 | A1* | 3/2012 | Trimper ............. H04N 21/2225 725/31 |
| 2012/0106342 | A1 | 5/2012 | Sundararajan et al. |
| 2012/0144288 | A1 | 6/2012 | Caruso et al. |
| 2012/0163427 | A1 | 6/2012 | Kim |
| 2012/0173594 | A1 | 7/2012 | Jogand-Coulomb et al. |
| 2012/0254456 | A1 | 10/2012 | Visharam et al. |
| 2012/0263241 | A1 | 10/2012 | Swensen |
| 2013/0044803 | A1 | 2/2013 | Fisher et al. |
| 2013/0262693 | A1 | 10/2013 | Phillips et al. |
| 2014/0089465 | A1* | 3/2014 | van Brandenburg . H04L 65/605 709/217 |

FOREIGN PATENT DOCUMENTS

| | | |
|---|---|---|
| WO | WO2011/015243 | 2/2011 |
| WO | WO2012/030175 | 3/2012 |
| WO | WO2012/145108 | 10/2012 |
| WO | WO2013/116554 | 8/2013 |
| WO | WO2014/178996 | 11/2014 |
| WO | WO2015/054395 | 4/2015 |

OTHER PUBLICATIONS

PCT Aug. 5, 2014 International Preliminary Report on Patentability from International Application U.S. Appl. No. PCT/US2013/024197 7 pages.

PCT Jul. 16, 2014 International Search Report and Written Opinion of the International Searching Authority from International Application U.S. Appl. No. PCT/US2014/033058.

PCT Jun. 3, 2013 International Search Report and Written Opinion from International Application Serial No. PCT/US2013/024197 10 pages.

PCT-Jun. 14, 2012 International Search Report and Written Opinion from International Application Serial No. PCT/US2012/029691 10 pages.

Krishnan, R., et al., "Traffic management models for http adaptive-streaming-aware CDN Interconnection," CDNI Internet Draft draft-krishnan-cdni-tm-has-00.txt; XP015086619, Jul. 30, 2012, 9 pages.

Shin, J., et al., "Content-Based Packet Video Forwarding Mechanism in Differentiated Service Networks," Proceedings of Packet Video Workshop '2000, Cagliari, Italy, May 2000; XP002317790, 10 pages http://www.gta.ufrj.br/diffserv/2000pv-diffvideo.pdf.

USPTO Dec. 4, 2014 Non-Final Office Action from U.S. Appl. No. 13/363,933.

PCT Jan. 22, 2015 International Search Report and Written Opinion of the International Searching Authority from International Application Serial No. PCT/US2014/059709.

USPTO Jan. 20, 2015 Non-Final Office Action from U.S. Appl. No. 13/873,589.

USPTO Jun. 3, 2015 Non-Final Office Action from U.S. Appl. No. 13/363,933.

USPTO Sep. 18, 2015 Final Office Action from U.S. Appl. No. 13/363,933.

USPTO May 20, 2015 Non-Final Office Action from U.S. Appl. No. 13/873,589.

USPTO Jul. 6, 2015 Non-Final Office Action from U.S. Appl. No. 13/869,811.

PCT Nov. 3, 2015 International Preliminary Report on Patentability from International Application Serial No. PCT/US2014/033058.

PRC Feb. 2, 2016 SIPO First Office Action from Chinese Application Serial No. CN201280018976.

Adobe Systems Incorporated, "Flexible delivery of on-demand and live video streaming," © 2011, 3 pages, http://www.adobe.com/products/httpdynamicstreaming/.

Cisco Press Release, "Cisco and Service Providers Aim to Reinvent the TV Experience with Videoscape," Cisco Systems, Jan. 5, 2011, Las Vegas, NV http://newsroom.cisco.com/press-release-content?type=webcontent&articleId=5856789.

Cisco Systems, "Videoscape Unity: The Future of Television," 2 pages [Retrieved and printed Oct. 2, 2013] http://www.cisco.com/en/US/netsol/ns1043/networking_solutions_market_segment_solution.html.

Ibanez, J., et al., "Preliminary Simulation Evaluation of an Assured Service," IETF Internet Draft, <draft-ibanez-diffserv-assured-eval-oo.txt>, Aug. 1998, 20 pages http://tools.ietf.org/html/draft-ibanez-diffserv-assured-eval-00.

ISO/IEC 13818-1 International Standard, "Information Technology—Generic Coding of Moving Pictures and Associated Audio Information: Systems," Dec. 1, 2000, © ISO/IEC 2000; printed in Switzerland; 174 pages.

MPEG Transport Stream from Wikipedia, the free encyclopedia; 7 pages, Sep. 6, 2012 http://enwikipedia.org/wiki/MPEG_transport_stream.

(56) References Cited

OTHER PUBLICATIONS

MPEG-2 from Wikipedia, the free encyclopedia; 32 pages; Sep. 6, 2012 http://en.wikipedia.org/wiki/MPEG-2.
Neglia, Giovanni, et al., "An Analytical Model of a new Packet Marking Algorithm for TCP Flows," Elsevier Science, Sep. 12, 2005, 28 pages http://www-sop.inria.fr/members/Giovanni.Neglia/publications/neglia06comnet.pdf.
Pantos, R., "HTTP Live Streaming," Informational Internet Draft, Nov. 19, 2010, 23 pages, http://tools.ietf.org/html/draft-pantos-http-live-streaming-05.
Pantos, R., "HTTP Live Streaming," Informational Internet Draft, Sep. 30, 2011, 34 pages, http://tools.ietf.org/html/draft-pantos-http-live-streaming-07.
PCT-Oct. 22, 2013 International Preliminary Report on Patentability from International Application Serial No. PCT/US2012/029691 10 pages.
USPTO Nov. 8, 2013 Notice of Allowance from U.S. Appl. No. 13/088,927.
USPTO Jan. 16, 2014 Non-Final Office Action from U.S. Appl. No. 13/363,933.
U.S. Appl. No. 13/088,927, filed Apr. 11, 2011 entitled "System and Method for Data Streaming in a Computer Network," Inventors: Robert D. Major, et al.
USPTO Dec. 7, 2012 Non-Final Office Action from U.S. Appl. No. 13/088,927.
USPTO Mar. 7, 2013 Response to Dec. 7, 2012 Non-Final Office Action from U.S. Appl. No. 13/088,927.
USPTO Jul. 2, 2013 Final Office Action from U.S. Appl. No. 13/088,927.
USPTO Oct. 2, 2013 RCE Response to Jul. 2, 2013 Final Office Action from U.S. Appl. No. 13/088,927.
U.S. Appl. No. 13/363,933, filed Feb. 1, 2012 entitled "System and Method to Reduce Stream Start-Up Delay for Adaptive," Inventors: David R. Oran, et al.
U.S. Appl. No. 13/348,094, filed Jan. 11, 2012 entitled "System and Method for Obfuscating Start-Up Delay in a Linear Media Service Environment," Inventors: Scott C. Labrozzi, et al.
USPTO Sep. 9, 2013 Non-Final Office Action from U.S. Appl. No. 13/348,094.
U.S. Appl. No. 13/679,413, filed Nov. 16, 2012, entitled "System and Method for Providing Alignment of Multiple Transcoders for Adaptive Bitrate Streaming in a Network Environment," Inventors: Gary K. Shaffer, et al.
U.S. Appl. No. 13/873,589, filed Apr. 30, 2013, entitled "Managing Bandwidth Allocation Among Flows Through Assignment of Drop Priority," Inventor(s): Joshua B. Gahm, et al.
U.S. Appl. No. 13/869,811, filed Apr. 24, 2013, entitled "Size Prediction in Streaming Environments," Inventors: Matthew Francis Caulfield, et al.
PCT Apr. 12, 2016 IPRP and Written Opinion from International Application Serial No. PCT/US2014/059709.
PRC Aug. 10, 2016 SIPO Second Office Action from Chinese Application Serial No. CN201280018976.
USPTO Jul. 18, 2016 Final Office Action from U.S. Appl. No. 13/363,933.
USPTO Feb. 1, 2016 Final Office Action from U.S. Appl. No. 13/869,811.
USPTO Jul. 6, 2016 Non-Final Office Action from U.S. Appl. No. 13/869,811.
PRC Jul. 27, 2016 SIPO First Office Action from Chinese Application Serial No. 201380007598.
USPTO Nov. 3, 2016 Notice of Allowance from U.S. Appl. No. 13/363,933.
USPTO Sep. 30, 2016 Non-Final Office Action from U.S. Appl. No. 13/679,413.
USPTO Jan. 25, 2017 Final Office Action from U.S. Appl. No. 13/869,811.

* cited by examiner

NAMESPACE
MAPPING
65

CDSM → Network Storage Share Configuration

//NAS-SERVER/Volume1/Media/ → /$(SystemPrefix)/vos.sp.net/VOD/

SRDN=vos.sp.net

CMS → Origin Storage Location

//NAS-SERVER/Volume1/Media/ModernFamily/Season1/Episode1.dash

//NAS-SERVER/Volume1/Media/ModernFamily/Season1/Episode1.ism.vdesc
//NAS-SERVER/Volume1/Media/ModernFamily/Season1/Episode1.m3u8.vdesc

CDN Publish URL & Origin Server URL

Source/Origin URL: http://SRDN/VOD/ModernFamily/Season1/Episode1.ism/Manifest

Publish URL: http://cdn.com/VOD/ModernFamily/Season1/Episode1.ism/Manifest

VIRTUAL ASSETS FOR ON-DEMAND CONTENT GENERATION

TECHNICAL FIELD

This disclosure relates in general to the field of communications and, more particularly, to a system, an apparatus, and a method associated with virtual assets for on-demand content generation in streaming environments.

BACKGROUND

End users have more media and communications choices than ever before. A number of prominent technological trends are currently afoot (e.g., more computing devices, more online video services, more Internet video traffic), and these trends are changing the media delivery landscape. Separately, these trends are pushing the limits of capacity and, further, degrading the performance of video, where such degradation creates frustration amongst end users, content providers, and service providers. In many instances, the video data sought for delivery is dropped, fragmented, delayed, or simply unavailable to certain end users.

Adaptive Streaming is a technique used in streaming multimedia over computer networks. While in the past, most video streaming technologies used either file download, progressive download, or custom streaming protocols, most of today's adaptive streaming technologies are based on hypertext transfer protocol (HTTP). These technologies are designed to work efficiently over large distributed HTTP networks such as the Internet.

HTTP-based Adaptive Streaming (HAS) operates by tracking a user's bandwidth and CPU capacity, and then selecting an appropriate representation (e.g., bandwidth and resolution) among the available options to stream. Typically, HAS would leverage the use of an encoder that can encode a single source video at multiple bitrates and resolutions (e.g., representations), which can be representative of either constant bitrate encoding (CBR) or variable bitrate encoding (VBR). The player client can switch among the different encodings depending on available resources. Ideally, the result of these activities is little buffering, fast start times, and good video quality experiences for both high-bandwidth and low-bandwidth connections.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes generating a key associated with a virtual asset associated with content to be provided to a client device, where the key indicates at least one parameter for accessing the content; generating the virtual asset; receiving a request for the content; identifying a format being requested for the content; using the virtual asset to identify common format content to be retrieved and to identify the key; using the key to retrieve the common format content; and transforming the common format content such that it can be delivered to the client device in the format that was requested.

Example Embodiments

Figure 1A:
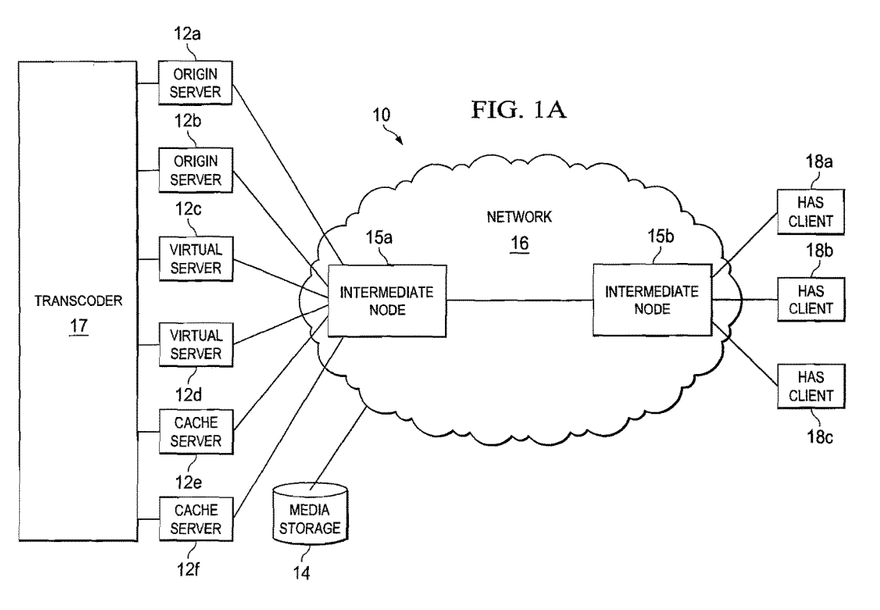
FIG. 1A is a simplified block diagram of a communication system for providing virtual asset generation in streaming environments in accordance with one embodiment of the present disclosure.

Turning to FIG. 1A, FIG. 1A is a simplified block diagram of a communication system 10 configured for providing on-demand encapsulation (ODE) for a plurality of virtual assets in streaming environments in accordance with one embodiment of the present disclosure. This architecture could be applicable, for example, to among adaptive bit-rate (ABR) flows for a plurality of clients.

Communication system 10 may include a plurality of origin servers 12a-b, virtual servers 12c-d, cache servers 12e-f, a media storage 14, a network 16, a transcoder 17, a plurality of hypertext transfer protocol (HTTP)-based Adaptive Streaming (HAS) clients 18a-c, and a plurality of intermediate nodes 15a-b. Note that the originating video source may be a transcoder that takes a single encoded source and "transcodes" it into multiple rates, or it could be a "Primary" encoder that takes an original non-encoded video source and directly produces the multiple rates. Therefore, it should be understood that transcoder 17 is representative of any type of multi-rate encoder, transcoder, etc.

Servers 12a-f are configured to deliver requested content to HAS clients 18a-c. The content may include any suitable information and/or data that can propagate in the network (e.g., video, audio, media, any type of streaming information, etc.). Certain content may be stored in media storage 14, which can be located anywhere in the network. Media storage 14 may be a part of any web server, logically connected to one of servers 12a-f, suitably accessed using network 16, etc. In general, communication system 10 can be configured to provide downloading and streaming capabilities associated with various data services. Communication system 10 can also offer the ability to manage content for mixed-media offerings, which may combine video, audio, games, applications, channels, and programs into digital media bundles.

Note that, as a general proposition, on-demand encapsulation is both memory intensive and computing intensive (e.g., the system receives bits, rearranges bits, potentially encodes certain content, etc.). On-demand encapsulation can be used to optimize storage and bandwidth resources in an Internet Protocol (IP) video distribution system that utilizes adaptive bit-rate streaming. While on-demand encapsulation optimizes the storage and bandwidth resources, the encapsulation process is computational intensive. The process itself involves data parsing, re-sequencing, and encryption. Typically, there is a finite number of on-demand encapsulation resources. Finite compute resources are allocated to perform on-demand encapsulation based on estimates of a certain working set size (the number of assets being accessed and, hence, encapsulated at a given time). Hence, optimizing these resources becomes critical, particularly so as the system becomes overloaded (e.g., oversubscribed).

On-demand encapsulation has been proposed as a method to solve the heterogeneous adaptive bit rate (ABR) delivery container formats. The on-demand encapsulation uses common intermediate format (CIF) content that can be transformed on-demand into the requested delivery container type. This basically reduces the storage and bandwidth needs at the same time increasing the addressability to multiple device types with diverse content protection and media container formats.

When using an on-demand content encapsulation solution, the content creation is typically performed in two stages: 1) creating the intermediate format assets (storage representation); and 2) creating the target/delivery format assets (client representation). The first of these stages is performed by an offline content packaging workflow, for example, for video on-demand (VOD) use cases. The second of these stages can be performed by multiple entities in the content distribution chain (e.g., from origin servers to edge caches).

Since target formats are not available until a client requests those contents, the content publishing workflows to navigation and catalog systems and the service delivery workflows for license and entitlement management have to be re-implemented and re-architected.

In certain embodiments of the present disclosure, the framework of communication system 10 can reuse existing content publishing and license management workflows, while retaining the advantages of on-demand encapsulation. A virtual asset can be used to represent the target format assets even though the bits for the target formats are not available until request time. In accordance with certain techniques of the present disclosure, the architecture of FIG. 1A can use an abstract intermediate template for a late binding of actual data and protection parameters to manifests and media delivery containers.

Hence, in certain example embodiments, there is a late binding of actual data to manifests based on abstracted intermediate representation metadata in the manifest produced for the intermediate representation. Additionally, the architecture of FIG. 1A can offer policy information about where the creation of the concrete representations of the various encapsulations happens. Further, specific details of the abstraction and late binding process can be provided to ensure adequate metadata to handle the various different representations. Existing content preparation, protection, and service delivery workflows can continue to work even though the target format data is produced on-demand. The architecture can also offer a distributed, policy-based late binding of target format ABR assets. Certain example implementations can provide for a reduced operational overhead in configuring multiple systems with a single system-wide statement of the workflow.

Note that there are various forms of late binding (e.g., extensible markup language (XML) extensible stylesheet language transformations (XSL)) and intermediate formats. However, such techniques do not transform partial resources in real-time and, further, they fail to offer the ability to randomly access parts of intermediate formats and subsequently produce requested resources on the fly. By contrast, communication system 10 can provide real-time and random access capabilities provided to transform parts of intermediate format resources in real-time. The unified scheme can be applicable to popular adaptive content delivery use-cases (e.g., Live, VOD, time-shifted TV (TSTV)).

In operation, virtual assets are used to assist on-demand real-time transformation of assets, along with the ability to transform smaller time segments of the assets in a random access fashion. The existing work order template mechanisms used in content management and VOD transcoding can be used for complete assets, where the transformation is not performed in real-time (i.e., assets can be fully transformed and published to any suitable storage system). With virtual assets, an advertised segment in the video timeline can be transformed. The virtual asset description can point to a media presentation description that offers the details of the timeline of all the elementary streams within the indexed media. Incoming requests for fragments and segments mapped to a time-stamp can be transformed and protected instantaneously.

Note that the virtual assets can be used to transform not only VOD contents, but also Live contents and time-shifted contents using a consistent late binding workflow. Asset preparation templates can perform real-time random-access transformation for all content delivery use cases. Upon creation of the virtual asset description and the associated content protection material, the assets can be published to the client devices without any delay. With the virtual assets, the preparation system need not wait for the contents to be fully transformed to all target types.

The virtual asset description format can assist in a cross system transfer of transformation and asset preparation policies. In certain cases, the virtual asset descriptions can be dynamically created on a per-user (per-client device) basis. This is specifically useful in scenarios of simulated/personalized broadcast, server-side ad-insertion and policy based profile pruning. Conceptually, the virtual asset can be thought of as analogous to an XSLT style sheet that is used to transform XML text resources to other text resources (e.g., HTML). In the segmented adaptive media domain, the virtual assets provide the style sheet to transform parts of media as (and when) it becomes available and, further, adds real-time content protection.

Hence, in at least one general sense, one point of significance resides in the construct of the virtual asset description, which can be viewed as a template in which the on-demand encapsulation can be described. Additionally, the virtual asset description can include parameters associated with the on-demand encapsulation process (e.g., encompassing parameters that a server would need to perform on-demand encapsulation).

Consider an example scenario content management systems are used to define the workflow and the content protection policies for the contents that are being created. Usually, an offline transcoder farm takes work orders from the content management systems to transcode the contents into multiple profiles and to encapsulate the contents into the requested delivery container after applying the necessary encryption.

When on-demand encapsulation is used, the content management systems can follow the same process with slightly different policies. First, the content management systems can instruct the transcode farm to not encapsulate the contents into the target containers and, instead, only create virtual assets for the target container type. Second, when the transcoding workflow finishes, a single asset bundle is created. The bundle contains the common intermediate format asset (storage representation) and one or more virtual assets (that may be for each target type (or) the same type with different encryption policies).

In one example embodiment, the virtual asset does not contain target delivery format data, but can contain pre-created metadata and parameters that facilitate the on-demand encapsulation, as well as optimize the encapsulation process. In one example implementation, the virtual asset can consist of the following components:
1) virtual asset description (metadata with policies on encapsulation and content protection parameters);
2) pre-created manifest files (for the VOD use case, the manifest files for target formats can be pre-created to jump-start the encapsulation process quickly); and
3) pre-created lookup-tables (that assists in providing a fast determination of the common intermediate format data).

Consider an example scenario in which a request arrives as: http://cdn.com/VOD/ModernFamily/Season1/Episode1.ism/Manifest. This request is intercepted by the CDN and, in case of a cache miss, it can be cache filled from the origin server (e.g., with an on-demand encapsulation function). Subsequently, the CDN replaces the domain name with the origin server's domain name and sends the request to the origin server. Next, the origin server will see the request as:
http://Origin-SRDN/VOD/ModernFamily/Season1/Episode1.ism/Manifest.

The media application for smooth streaming (HSS) can intercept this request and first searches for the server side manifest for target format asset using http://Origin-SRDN/VOD/ModernFamily/Season1/Episode1.ism as the key. This is the URL of the HSS server-side manifest file. From this point, if this server-side manifest is found, the object is available in the target format readily and the on-demand encapsulation workflow is skipped. If this server-side manifest is not found, the origin server searches the storage to find the virtual asset description. The virtual asset description is usually the server-side manifest a ".vdesc" suffix. In this example, it would be provided as:
http://Origin-SRDN/VOD/ModernFamily/Season1/Episode1.ism.vdesc.

If the virtual asset description if found, the ODE transformation process can be bootstrapped with the information in the virtual asset description. The ODE framework then uses the policies and settings to create the required manifest and sends the response. It can use the public handles for key acquisition to acquire the protection keys. The ODE framework can use the source information block to determine the source media description that should be used for the transformation process. It then acquires the required resources and then delivers the requested resources using the appropriate format, protocol, etc.

It should be noted that such a virtual asset generation paradigm can be deployed regardless of the underlying transport protocol's (e.g., TCP, SCTP, MP-TCP, etc.) behavior. Note also that the mechanism described here may be used in different ways in different applications (such as applications different from the examples given below) to achieve enhanced bandwidth management, resource optimization, and performance.

Figure 1B:
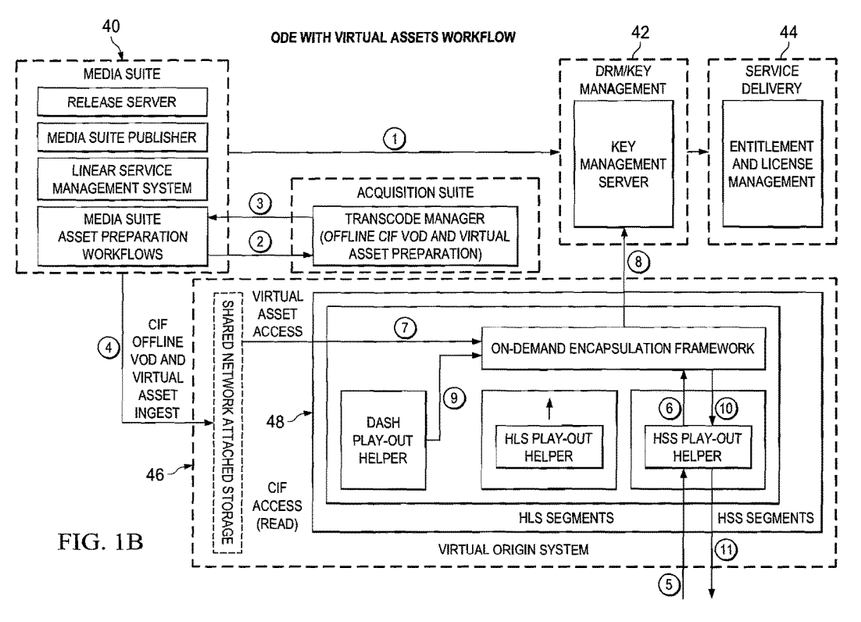
FIG. 1B is a simplified block diagram illustrating one possible example implementation associated with the communication system.

Turning to FIG. 1B, FIG. 1B illustrates one example workflow associated with ODE for virtual assets. FIG. 1B may include a media suite 40, which may further include a release server, a media suite publisher, a linear service management system, and a media suite asset preparation workflows element. Additionally, FIG. 1B may include a digital rights management (DRM)/key management 42 that may include a key management server. Additionally, FIG. 1B may include a service delivery 44 and a virtual origin system 46 that includes an on-demand encapsulation module 48, which may further include an on-demand encapsulation framework, along with multiple play-out helpers.

The initial steps of #1-#4 are associated with asset production. When an asset is created, the content and the common format is generated, along with the virtual asset description, which provides instructions that can be used at a later stage. When incoming requests are received by the on-demand encapsulation servers, the on-demand encapsulation servers can look for the content being requested and the asset descriptions. Subsequently, the on-demand encapsulation servers can execute the workflow associated with a particular virtual asset that was requested. In one particular example, when content is transcoded (during asset preparation), the virtual asset description is generated. Hence, even without the asset being initially available, the virtual asset can be used to describe an asset to be produced at a later time.

Therefore, at the completion of the asset preparation stage, the system believes that the content has been created. In reality, the content is yet to be produced in a final form, only the common format that is needed has been generated. When the actual request arrives, the content in the final format is then created. Initially, only the virtual asset/virtual asset description file is created that is indicative of the final asset to be created (e.g., inclusive of policy characteristics, etc.). At step #4, the virtual asset description can be ingested at a shared network storage element, as is shown in FIG. 1B.

Steps #5-#11 are generally referring to activities associated with delivering the requested content to any number of client devices. More specifically, step #5 involves receiving a request for particular content. The particular content may be associated with on-demand video, live content that may be streaming, previously recorded content, etc. The system would then check if a virtual asset is present for the particular content at step #6. If the virtual asset were present, then the virtual asset description file would be read at step #7. The description essentially dictates what should happen for that virtual asset. For example, for a particular type of content, a particular key could be used to protect the content. Hence, the key can be updated (at step #8) at the key management server. The content can then be pulled through the common format delivery system at step #9. Then the content would naturally flow to the on-demand encapsulation framework and onto the play-out helper for subsequent delivery to the endpoint that requested the content (steps #10-#11).

Figures 1C, 1D:
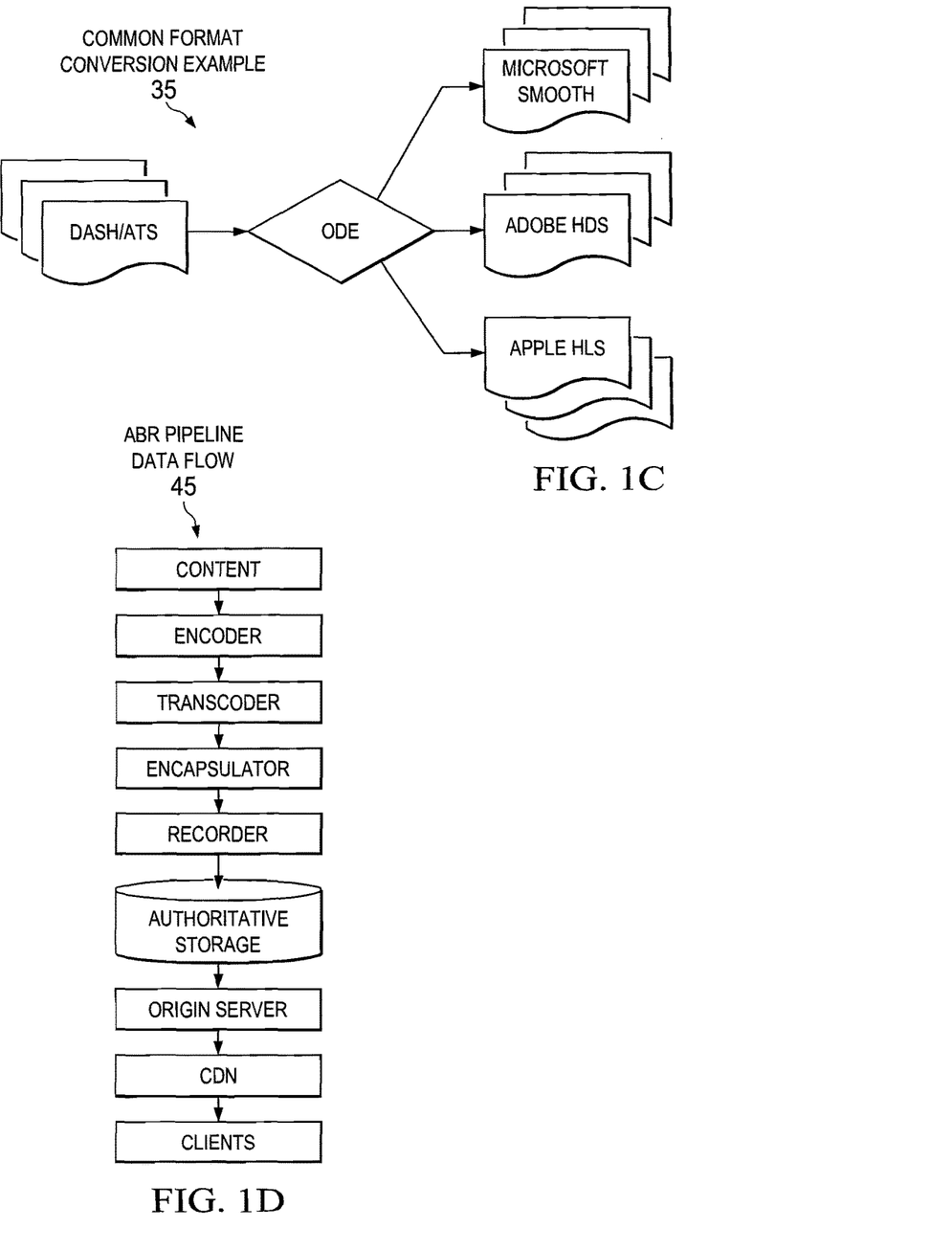
FIG. 1C is a simplified schematic diagram illustrating a common format conversion example associated with the present disclosure.
FIG. 1D is a simplified block diagram illustrating an example pipeline dataflow associated with the present disclosure.

Turning to FIG. 1C, FIG. 1C can be used to understand some of the bandwidth challenges encountered in a network that includes HAS clients. The following foundational information may be viewed as a basis or context associated with virtual asset generation for on-demand encapsulation systems. Adaptive streaming video systems make use of multi-rate video encoding and an elastic IP transport protocol suite (typically hypertext transfer protocol/transmission control protocol/Internet protocol (HTTP/TCP/IP), but could include other transports such as HTTP/SPDY/IP, etc.) to deliver high-quality streaming video to a multitude of simultaneous users under widely varying network conditions. These systems are typically employed for "over-the-top" video services, which accommodate varying quality of service over network paths.

In adaptive streaming, the source video is encoded such that the same content is available for streaming at a number of different rates (this can be via either multi-rate coding, such as H.264 AVC, or layered coding, such as H.264 SVC). The video can be divided into "chunks" of one or more group-of-pictures (GOP) (e.g., typically two (2) to ten (10) seconds of length). HAS clients can access chunks stored on servers (or produced in near real-time for live streaming) using a web paradigm (e.g., HTTP GET operations over a TCP/IP transport), and they depend on the reliability, congestion control, and flow control features of TCP/IP for data delivery. HAS clients can indirectly observe the performance of the fetch operations by monitoring the delivery rate and/or the fill level of their buffers and, further, either upshift to a higher encoding rate to obtain better quality when bandwidth is available, or downshift in order to avoid buffer underruns and the consequent video stalls when available bandwidth decreases, or stay at the same rate if available bandwidth does not change. Compared to inelastic systems such as classic cable TV or broadcast services, adaptive streaming systems use significantly larger amounts of buffering to absorb the effects of varying bandwidth from the network.

In a typical scenario, HAS clients would fetch content from a network server in segments. Each segment can contain a portion of a program, typically comprising a few seconds of program content. [Note that the term 'segment' and 'chunk' are used interchangeably in this disclosure.] For each portion of the program, there are different segments available with higher and with lower encoding bitrates: segments at the higher encoding rates require more storage and more transmission bandwidth than the segments at the lower encoding rates. HAS clients adapt to changing network conditions by selecting higher or lower encoding rates for each segment requested, requesting segments from the higher encoding rates when more network bandwidth is available (and/or the client buffer is close to full), and requesting segments from the lower encoding rates when less network bandwidth is available (and/or the client buffer is close to empty).

FIG. 1C is a simplified schematic diagram illustrating a common format version example 35 associated with the present disclosure. A fundamental problem in content delivery is the need to serve a wide variety of client devices. For example, in the context of ABR video, these various client device types each require specific metadata and specific video formats. The following are examples of prevalent ABR client types: Microsoft HTTP Smooth Streaming (HSS), Apple HTTP Live Streaming (HLS), and Adobe Zeri (HDS). A server that handles requests from a heterogeneous pool of ABR clients should store its content in a form that can be easily translated to the target client format. In a simple implementation, such a server could store a separate copy of a piece of content for each client device type. However, this approach negatively impacts storage and bandwidth usage. In a caching network (CDN), for example, multiple formats of the same piece of content would be treated independently, further exacerbating the problem.

ODE attempts to address several issues associated with storage and bandwidth. With ODE, a single common format representation of each piece of content can be stored and cached by the server. Upon receiving a client request, the server can re-encapsulate the common format representation into a client device format. ODE provides a tradeoff between storage and computation. While storing a common format representation incurs lower storage overhead, re-encapsulating that representation on-demand is considerably more expensive (in terms of computation) than storing each end-client representation individually.

A common format should be chosen to meet the needs of all client device types. Moreover, the common format and its associated metadata should be easily translated into either client format (as depicted in the example of FIG. 1C). Adaptive Transport Stream (ATS) is an ABR conditioned moving picture experts group (MPEG)-transport stream (TS) (MPEG2-TS) with in-band metadata for signaling ABR fragment and segment boundaries. Dynamic Adaptive Streaming over HTTP (DASH) is a standard for describing ABR content. The common format specification is fundamental to ODE.

FIG. 1D is a simplified block diagram illustrating an example pipeline dataflow 40 associated with an ABR application. The ABR content workflow may be understood as a pipeline of functional blocks strung together for delivering ABR content to clients. Content can arrive at the system in a raw format. The encoding stage can convert the raw format content into a compressed form at a single high-quality level. The transcoding stage produces multiple lower-quality versions of the content from the single high-quality version. The encapsulation stage typically prepares the content at a quality-level for a specific end-client type (e.g., Smooth, HLS, etc.). The recording stage accepts the set of contents, including formats for multiple clients with multiple quality-levels, and saves them to an authoritative store. At the origination stage (upon receiving a request) serves content based on client type and the requested quality level.

The CDN can cache content in a hierarchy of locations to decrease the load on the origination stage and, further, to improve the quality of experience for the users in the client stage. Finally, the client stage can decode and present the content to the end user. The pipeline can be similar for both Live and video on-demand (VoD) content, although in the case of VoD the recording stage may be skipped entirely. For VoD, content can be stored on a Network-Attached Storage (NAS) for example. Some of the more significant aspects of ODE take place between the encapsulation and origination stages of the pipeline. The encapsulation stage produces the common format media and indexing metadata. The recording stage accepts the common format and writes it to storage. The origination stage reads the common format representation of content and performs the encapsulation when a request is received from a particular client type.

Figure 1E:
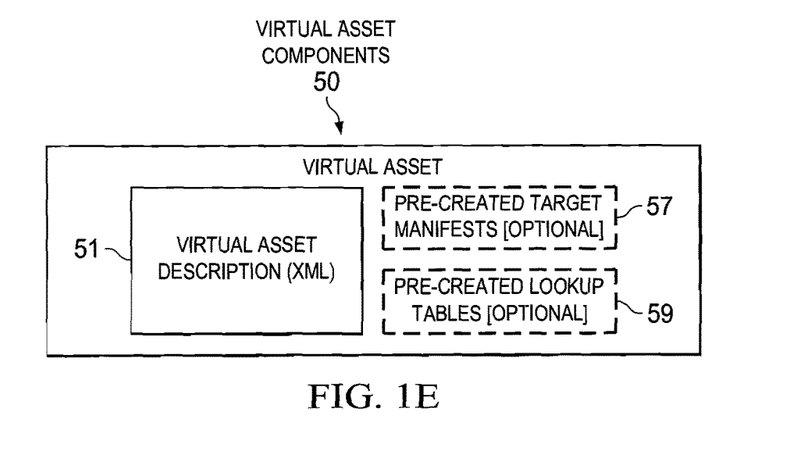
FIG. 1E is a simplified block diagram illustrating one possible example of a virtual asset associated with the communication system.

Turning to FIG. 1E, FIG. 1E is a simplified block diagram illustrating one possible example of a virtual asset 50 associated with communication system 10. Virtual asset 50 may include a virtual asset description 51 that may be XML-based. In addition, FIG. 1E may include a pre-created target manifests element 57 and a pre-created lookup tables element 59. Note that pre-created target manifests element 57 and/or pre-created lookup tables element 59 are optional in accordance with the teachings of the present disclosure.

Figure 1F:
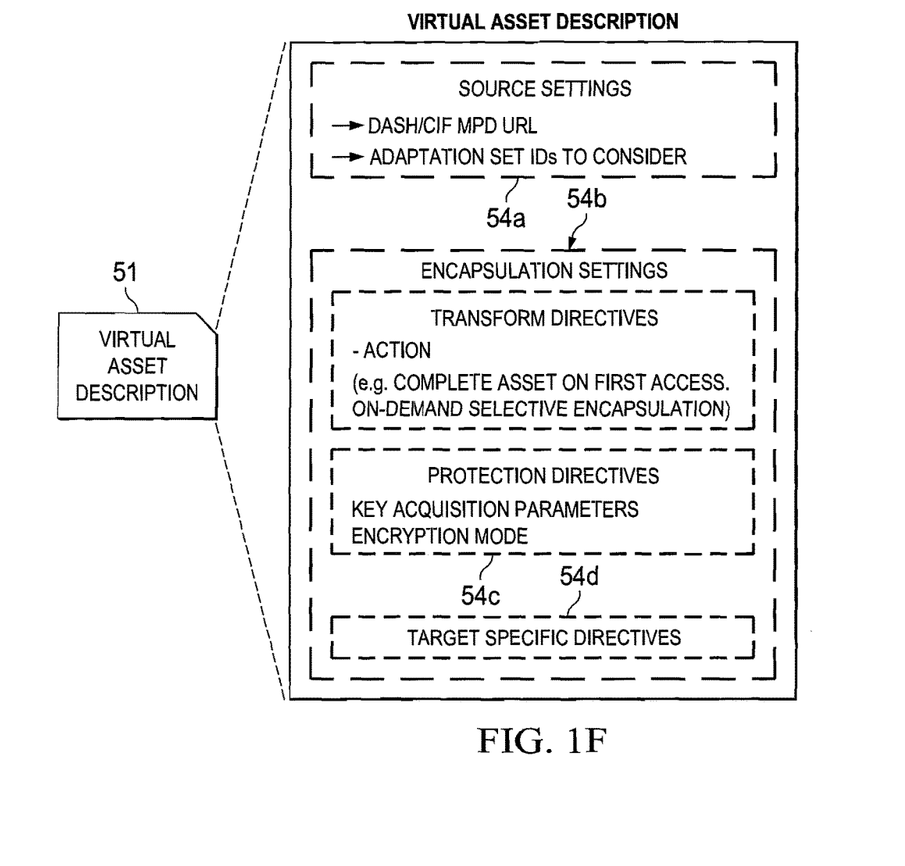
FIG. 1F is a simplified block diagram illustrating one possible example of a virtual asset description associated with the communication system.
Figure 1G:
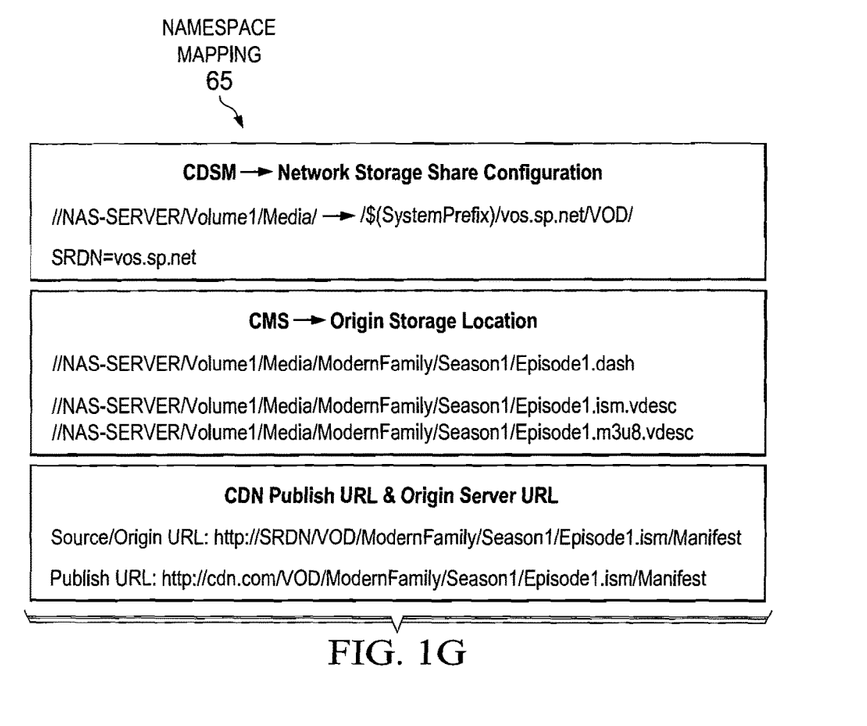
FIG. 1G is a simplified block diagram illustrating one possible example of a namespace mapping associated with the communication system.

FIG. 1F is a simplified block diagram illustrating one possible example of virtual asset description 51 to be used in conjunction with communication system 10. Virtual asset description 51 may include one or more source settings 54a, which may further include items such as DASH/CIF MPD URL, adaptation set IDs to consider, etc. Virtual asset description 51 may also include any number of encapsulation settings 54b, which may further include transform directives, protection directives 54c (inclusive of key acquisition parameters, encryption modes, etc.), and one or more target specific directives 54d. FIG. 1G is a simplified block diagram illustrating one possible example of a namespace mapping 65 associated with communication system 10. Namespace mapping 65 may include network storage share configuration data, origin storage location data, URL data, or any other suitable information that can affect workflows in the context of the present disclosure.

Figure 2:
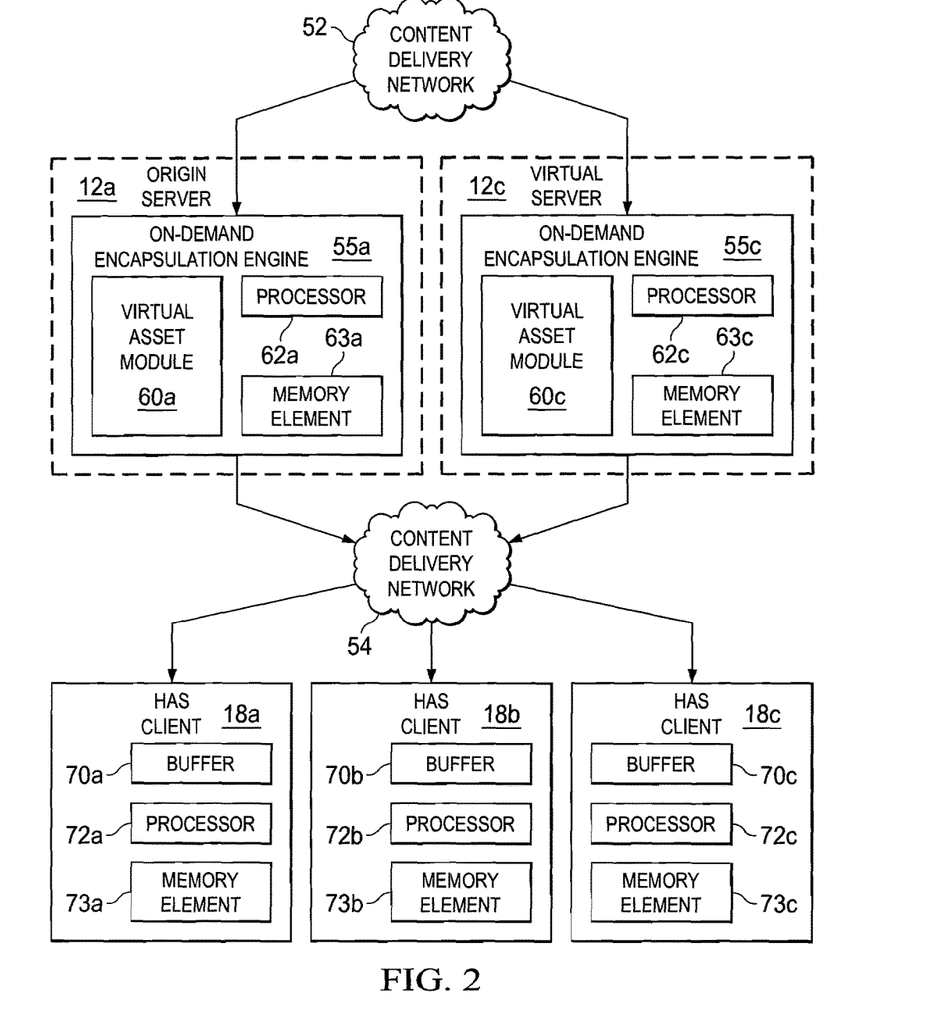
FIG. 2 is a simplified block diagram illustrating possible example details associated with particular scenarios involving the present disclosure.

Turning to FIG. 2, FIG. 2 is a simplified block diagram illustrating one possible architecture that may be associated with the present disclosure. FIG. 2 illustrates the flexibility associated with the present disclosure in that an on-demand encapsulation engine (inclusive of a virtual asset module) may be provisioned in any suitable location (e.g., within an origin server, within a virtual server, within a cache server, within a client device, etc.). This particular example illustrates the on-demand encapsulation engine being provisioned in origin server 12a, virtual server 12c, and within several HAS clients 18a-c. Each of these elements can include a respective on-demand encapsulation engine 55a, 55c. Additionally, origin server 12a and virtual server 12c can include a respective virtual asset module 60a, 60c, a respective processor 62a-c, and a respective memory element 63a-c. Each of HAS clients 18a-c can include a respective buffer 70a-c, a respective processor 72a-c, and a respective memory element 73a-c. Note that any of the server implementations discussed herein can operate somewhat independently, without having to upgrade each of the client devices to accommodate the teachings of the present disclosure. In other cases, each of the clients can cooperate with the servers in executing (or at least sharing) some of the responsibilities associated with virtual asset generations, as discussed herein.

Referring briefly back to certain internal structure that could be used to accomplish the teachings of present disclosure, HAS clients 18a-c can be associated with devices, customers, or end users wishing to receive data or content in communication system 10 via some network. The term 'HAS client' and 'client device' is inclusive of any devices used to initiate a communication, such as any type of receiver, a computer, a set-top box, an Internet radio device (IRD), a cell phone, a smartphone, a laptop, a tablet, a personal digital assistant (PDA), a Google Android™, an iPhone™, an iPad™, a Microsoft Surface™, or any other device, component, element, endpoint, or object capable of initiating voice, audio, video, media, or data exchanges within communication system 10. HAS clients 18a-c may also be inclusive of a suitable interface to the human user, such as a display, a keyboard, a touchpad, a remote control, or any other terminal equipment. HAS clients 18a-c may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, audio, or script data, or any type of source or object code, or any other suitable information in any appropriate format that may be communicated from one point to another.

Transcoder 17 (or a multi-bitrate encoder) is a network element configured for performing one or more encoding operations. For example, transcoder 17 can be configured to perform direct digital-to-digital data conversion of one encoding to another (e.g., such as for movie data files or audio files). This is typically done in cases where a target device (or workflow) does not support the format, or has a limited storage capacity that requires a reduced file size. In other cases, transcoder 17 is configured to convert incompatible or obsolete data to a better-supported or more modern format.

Network 16 represents a series of points or nodes of interconnected communication paths for receiving and transmitting packets of information that propagate through communication system 10. Network 16 offers a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. A network can comprise any number of hardware or software elements coupled to (and in communication with) each other through a communications medium.

In one particular instance, the architecture of the present disclosure can be associated with a service provider digital subscriber line (DSL) deployment. In other examples, the architecture of the present disclosure would be equally applicable to other communication environments, such as an enterprise wide area network (WAN) deployment, cable scenarios, broadband generally, fixed wireless instances, fiber-to-the-x (FTTx), which is a generic term for any broadband network architecture that uses optical fiber in last-mile architectures, and data over cable service interface specification (DOCSIS) cable television (CATV). The architecture can also operate in junction with any 3G/4G/LTE cellular wireless and WiFi/WiMAX environments. The architecture of the present disclosure may include a configuration capable of transmission control protocol/internet protocol (TCP/IP) communications for the transmission and/or reception of packets in a network.

In more general terms, servers 12a-f are network elements that can facilitate the virtual asset generation activities discussed herein. As used herein in this Specification, the term 'network element' is meant to encompass any of the aforementioned elements, as well as routers, switches, cable boxes, gateways, bridges, data center elements, loadbalancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, HAS clients 18a-c and/or servers 12a-f include software to achieve (or to foster) the virtual asset generation activities discussed herein. This could include the implementation of instances of virtual asset modules 60, on-demand encapsulation engines 55, and/or any other suitable element that would foster the activities discussed herein. Additionally, each of these elements can have an internal structure (e.g., a processor, a memory element, etc.) to facilitate some of the operations described herein. In other embodiments, these virtual asset generation activities may be executed externally to these elements, or included in some other network element to achieve the intended functionality. Alternatively, HAS clients 18a-c and/or servers 12a-f may include software (or reciprocating software) that can coordinate with other network elements in order to achieve the virtual asset generation activities described herein. In still other embodiments, one or several devices may include any suitable algorithms, hardware, software, components, modules, interfaces, or objects that facilitate the operations thereof.

In certain alternative embodiments, the virtual asset generation techniques of the present disclosure can be incorporated into a proxy server, web proxy, cache, CDN, etc. This could involve, for example, instances of virtual asset modules 60, on-demand encapsulation engines 55, etc. being provisioned in these elements. Alternatively, simple messaging or signaling can be exchanged between an HAS client and these elements in order to carry out the activities discussed herein.

In operation, a CDN can provide bandwidth-efficient delivery of content to HAS clients 18*a-c* or other endpoints, including set-top boxes, personal computers, game consoles, smartphones, tablet devices, iPads™, iPhones™, Google Droids™, Microsoft Surfaces™, customer premises equipment, or any other suitable endpoint. Note that servers 12*a-f* (previously identified in FIG. 1A) may also be integrated with or coupled to an edge cache, gateway, CDN, or any other network element. In certain embodiments, servers 12*a-f* may be integrated with customer premises equipment (CPE), such as a residential gateway (RG).

As identified previously, a network element can include software (e.g., virtual asset modules 60, on-demand encapsulation engines 55, etc.) to achieve the virtual asset generation operations, as outlined herein in this document. In certain example implementations, the virtual asset generation functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by a processor [processors shown in FIG. 2], or other similar machine, etc.). In some of these instances, a memory element [memories shown in FIG. 2] can store data used for the operations described herein. This includes the memory element being able to store instructions (e.g., software, code, etc.) that are executed to carry out the activities described in this Specification. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the virtual asset generation activities, as outlined herein. Additionally, each of these devices may include a processor that can execute software or an algorithm to perform the virtual asset generation activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that while the preceding descriptions have addressed certain ABR management techniques, it is imperative to note that the present disclosure can be applicable to other protocols and technologies (e.g., Microsoft Smooth™ Streaming (HSS™), Apple HTTP Live Streaming (HLS™), Adobe Zeri™ (HDS), Silverlight™, time-shifting technologies, VOD technologies, etc.). In addition, yet another example application that could be used in conjunction with the present disclosure is Dynamic Adaptive Streaming over HTTP (DASH), which is a multimedia streaming technology that could readily benefit from the techniques of the present disclosure. DASH is an adaptive streaming technology, where a multimedia file is partitioned into one or more segments and delivered to a client using HTTP. A media presentation description (MPD) can be used to describe segment information (e.g., timing, URL, media characteristics such as video resolution and bitrates). Segments can contain any media data and could be rather large. DASH is codec agnostic. One or more representations (i.e., versions at different resolutions or bitrates) of multimedia files are typically available, and selection can be made based on network conditions, device capabilities, and user preferences to effectively enable adaptive streaming. In these cases, communication system 10 could perform appropriate virtual asset generation based on the individual needs of clients, servers, etc.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its techniques) are readily scalable and, further, can accommodate a large number of components, as well as more complicated/sophisticated arrangements and configurations. Accordingly, the examples provided should not limit the scope or inhibit the broad techniques of communication system 10, as potentially applied to a myriad of other architectures.

It is also important to note that the steps in the preceding FIGURES illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   generating a key associated with a virtual asset associated with content to be provided to a client device, wherein the key indicates at least one parameter for accessing the content;
   generating the virtual asset, wherein the virtual asset identifies the key and includes a Uniform Resource Locator ("URL") for a location at which common format content to be retrieved in connection with the content is stored and wherein the virtual asset comprises an abstract intermediate template including a virtual asset description for enabling performance of a late binding of actual data and protection parameters to manifests and media delivery containers associated with the content;
   receiving a request for the content;
   identifying a format being requested for the content;
   retrieving the common format content from a location identified by the URL; and
   transforming the retrieved common format content to be delivered to the client device in the identified format using the virtual asset as a style sheet to add real-time content protection.

2. The method of claim 1, wherein the key is associated with encryption of the content.

3. The method of claim 1, wherein the virtual asset contains pre-created metadata and parameters that facilitate on-demand encapsulation and that optimize at least one on-demand encapsulation process.

4. The method of claim 1, wherein the virtual asset includes a description, which includes metadata for at least one policy for corresponding encapsulation.

5. The method of claim 1, wherein generating the virtual asset further comprises:
   communicating a notification that the content has been generated; and
   moving the content to a storage system.

6. The method of claim 1, wherein the virtual asset includes a virtual asset description, which includes pre-created manifest files for a video on-demand (VOD) activity.

7. The method of claim 1, wherein the virtual asset includes a virtual asset description, which includes one or more pre-created lookup-tables to assist in determining common intermediate format data.

8. The method of claim 1, wherein a plurality of virtual asset descriptions for plurality of virtual assets are created dynamically on a per-client device basis.

9. The method of claim 1, further comprising:
   invoking an on-demand encapsulation framework, wherein the on-demand encapsulation framework uses policies and settings to create a manifest file.

10. The method of claim 9, wherein the on-demand encapsulation framework uses a source information block to determine a source media presentation description (MPD) that should be used for the transforming of the common format content.

11. A computer program product comprising one or more non-transitory tangible media that includes code for execution and when executed by a processor operable to perform operations comprising:
    generating a key associated with a virtual asset associated with content to be provided to a client device, wherein the key indicates at least one parameter for accessing the content;
    generating the virtual asset, wherein the virtual asset identifies the key and includes a Uniform Resource Locator ("URL") for a location at which common format content to be retrieved in connection with the content is stored and wherein the virtual asset comprises an abstract intermediate template including a virtual asset description for enabling performance of a late binding of actual data and protection parameters to manifests and media delivery containers associated with the content;
    receiving a request for the content;
    identifying a format being requested for the content;
    retrieving the common format content from a location identified by the URL; and
    transforming the retrieved common format content to be delivered to the client device in the identified format using the virtual asset as a style sheet to add real-time content protection.

12. The computer program product of claim 11, wherein the key is associated with encryption of the content.

13. The computer program product of claim 11, wherein the virtual asset contains pre-created metadata and parameters that facilitate on-demand encapsulation and that optimize at least one on-demand encapsulation process.

14. The computer program product of claim 11, wherein the virtual asset includes a virtual asset description, which includes metadata for at least one policy for corresponding encapsulation.

15. A network element, comprising:
    a processor;
    a memory;
    an on-demand encapsulation engine; and
    a virtual asset module, wherein the network element is configured for:
      generating a key associated with a virtual asset associated with content to be provided to a client device, wherein the key indicates at least one parameter for accessing the content;
      generating the virtual asset, wherein the virtual asset identifies the key and includes a Uniform Resource Locator ("URL") for a location at which common format content to be retrieved in connection with the content is stored and wherein the virtual asset comprises an abstract intermediate template including a virtual asset description for enabling performance of a late binding of actual data and protection parameters to manifests and media delivery containers associated with the content;

receiving a request for the content;

identifying a format being requested for the content;

retrieving the common format content from a location identified by the URL; and transforming the retrieved common format content to be delivered to the client device in the identified format using the virtual asset as a style sheet to add real-time content protection.

16. The network element of claim 15, wherein the key is associated with encryption of the content.

17. The network element of claim 15, wherein the virtual asset contains pre-created metadata and parameters that facilitate on-demand encapsulation and that optimize at least one on-demand encapsulation process.

18. The network element of claim 15, wherein a plurality of virtual asset descriptions for plurality of virtual assets are created dynamically on a per-client device basis.

19. The network element of claim 15, wherein the network element is further configured for:

invoking an on-demand encapsulation framework, wherein the on-demand encapsulation framework uses policies and settings to create a manifest file.

20. The network element of claim 19, wherein the on-demand encapsulation framework uses a source information block to determine a source media presentation description (MPD) that should be used for the transforming of the common format content.

* * * * *